(12) United States Patent
Bogisch et al.

(10) Patent No.: US 6,746,076 B2
(45) Date of Patent: Jun. 8, 2004

(54) WINDBREAK DEVICE FOR AN OPEN MOTOR VEHICLE

(75) Inventors: Axel Bogisch, Grafenau (DE); Thomas Foelster, Grafenau (DE); Vasilios Orizaris, Renningen (DE); Karl Pfahler, Stuttgart (DE); Juergen Schrader, Weil im Schönbuch (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/963,664

(22) Filed: Sep. 27, 2001

(65) Prior Publication Data
US 2002/0041116 A1 Apr. 11, 2002

(30) Foreign Application Priority Data
Sep. 27, 2000 (DE) .......................... 100 47 754

(51) Int. Cl.[7] ............................................. A47C 31/00
(52) U.S. Cl. ................................................. 297/180.14
(58) Field of Search .................... 297/180.1, 180.12, 297/180.11, 180.13, 180.14, 180.16, 452.42, 248, 452.41; 5/652.1, 652.2; 219/217

(56) References Cited

U.S. PATENT DOCUMENTS

| | | | | |
|---|---|---|---|---|
| 1,091,816 A | * | 3/1914 | Dudderar | |
| 1,439,681 A | * | 12/1922 | Alkire et al. | |
| 1,475,912 A | * | 11/1923 | Williams | |
| 2,931,427 A | * | 4/1960 | Goldstein | |
| RE25,710 E | * | 1/1965 | Ouellette | |
| 3,785,600 A | * | 1/1974 | Padovano | |
| 4,002,108 A | * | 1/1977 | Drori | |
| 4,685,727 A | * | 8/1987 | Cremer et al. | |
| 4,923,248 A | * | 5/1990 | Feher | |
| 5,002,336 A | * | 3/1991 | Feher | |
| 5,016,302 A | * | 5/1991 | Yu | |
| 5,102,189 A | * | 4/1992 | Saito et al. | |
| 5,137,326 A | * | 8/1992 | George | 296/208 |
| 5,626,386 A | * | 5/1997 | Lush | |
| 5,785,388 A | * | 7/1998 | Curtis | |
| 5,927,817 A | * | 7/1999 | Ekman et al. | |
| 6,059,018 A | * | 5/2000 | Yoshinori et al. | |
| 6,062,641 A | * | 5/2000 | Suzuki et al. | |
| 6,079,781 A | * | 6/2000 | Tilley | |
| 6,341,814 B1 | | 1/2002 | Hoenninger et al. | 296/208 |

FOREIGN PATENT DOCUMENTS

| | | |
|---|---|---|
| DE | G9201474.7 | 5/1992 |
| DE | 199 08 497 | 9/2000 |
| FR | 2 630 056 | 10/1989 |

* cited by examiner

Primary Examiner—Milton Nelson, Jr.
(74) Attorney, Agent, or Firm—Crowell & Moring LLP

(57) ABSTRACT

A windbreak device is provided for an open motor vehicle, in whose passenger cell at least one vehicle seat having a backrest and associated head restraint is arranged. Air outflow openings of the air-distributing device are provided level with an upper region of the backrest in order to avoid undesirable draughts for the vehicle occupant. The air-distributing device is integrated in the backrest and is supported directly by the latter.

30 Claims, 3 Drawing Sheets

WINDBREAK DEVICE FOR AN OPEN MOTOR VEHICLE

BACKGROUND AND SUMMARY OF THE INVENTION

This application claims the priority of German Patent Document 100 47 754.2, filed in Germany, Sep. 27, 2000, the disclosure of which is expressly incorporated by reference herein.

The invention relates to a windbreak device for an open motor vehicle in whose passenger cell at least one vehicle seat having a backrest and associated head restraint is arranged, air outflow openings of an air-distributing devise being provided level with the upper region of the backrest in order to reduce undesirable draughts for the vehicle occupant.

German Patent Document DE 92 01 474 U1 discloses a windbreak device of this type for an open motor vehicle, in whose passenger cell two vehicle seats which are arranged in a row and have backrests and associated head restraints. In order to reduce undesirable draughts for the vehicle occupants, a tube which runs in the transverse direction of the vehicle and has air outflow openings is provided at a distance behind the seats and level with the upper region of the backrest or of the head restraints.

One disadvantage in this case is that the tube, which runs over approximately the entire width of the vehicle, is arranged in a relatively bulky manner within the passenger cell, which, for example in the case of a motor vehicle having two rows of seats, makes the access to the rear seat bench at least considerably more difficult. It is also disadvantageous that when the longitudinal settings of the two vehicle seats differ, the distance between the air outflow openings and the associated backrest is relatively large, which means that the desired effect of the windbreak device for the vehicle occupant can no longer be achieved.

It is therefore an object of the invention to provide a windbreak device of the type mentioned at the beginning which can be arranged in a space-saving manner within the passenger cell and can be used better in the case of vehicles having a number of rows of seats.

According to the invention, this object is achieved by a windbreak device for an open motor vehicle, in whose passenger cell at least one vehicle seat having a backrest and associated head restraint is arranged, air outflow openings of an air-distributing device being provided level with the upper region of the backrest in order to reduce undesirable draughts for the vehicle occupant, wherein the air-distributing device is integrated in the backrest and is supported directly by the latter.

Advantageous refinements of the invention are described below and in the claims.

According to the invention, the air-distributing device of the windbreak device is integrated in the backrest of the vehicle seat, so that, for example in the case of a row of seats having two vehicle seats, a separate air-distributing device is assigned to each of the seats and is supported by the latter. The distance between the air outflow openings and the backrest, including the head restraint and the head and neck area of the vehicle occupant therefore remains constant, as a result of which an equally good effect of the windbreak device can be obtained irrespective of the longitudinal setting of the vehicle seat. In addition, by the integration of the air-distributing device in the space which is in any case present in the backrest, structural space within the passenger cell can be saved, in which case the windbreak device according to the invention can be used in particular even in a motor vehicle having two rows of seats without the access to the rear seat bench being made difficult. In this case, the air-distributing device can be arranged completely within the associated backrest or, for example, can be integrated in its rear backrest lining.

By making the air flows available in the vicinity of the head, neck and shoulder region of the passenger, the swirling of air which is prevalent there is effectively reduced, it being possible—depending on the passenger's desires—for the outflowing air to be heated by a heating element integrated in the backrest.

If the air outflow openings are arranged on the narrow sides of the vehicle seat according to certain preferred embodiments of the invention, in which case the air flows flow out essentially in the transverse direction of the vehicle, then the swirling of air over a large area behind the head, neck and shoulder region of the occupant can be compensated for.

If the vehicle seat is covered in the upper region of the backrest with a covering made of porous material or perforated leather according to certain preferred embodiments of the invention, then this material or leather brings about a desired, diffuse distribution of the outflowing air in the head, neck and shoulder region of the occupant.

A wind shield additionally integrated in the backrest according to certain preferred embodiments of the invention can contribute to further reducing the swirling of the air.

Other objects, advantages and novel features of the present invention will become apparent from the following detailed description of the invention when considered in conjunction with the accompanying drawings.

DETAILED DESCRIPTION OF THE DRAWINGS

Figures 1, 2:
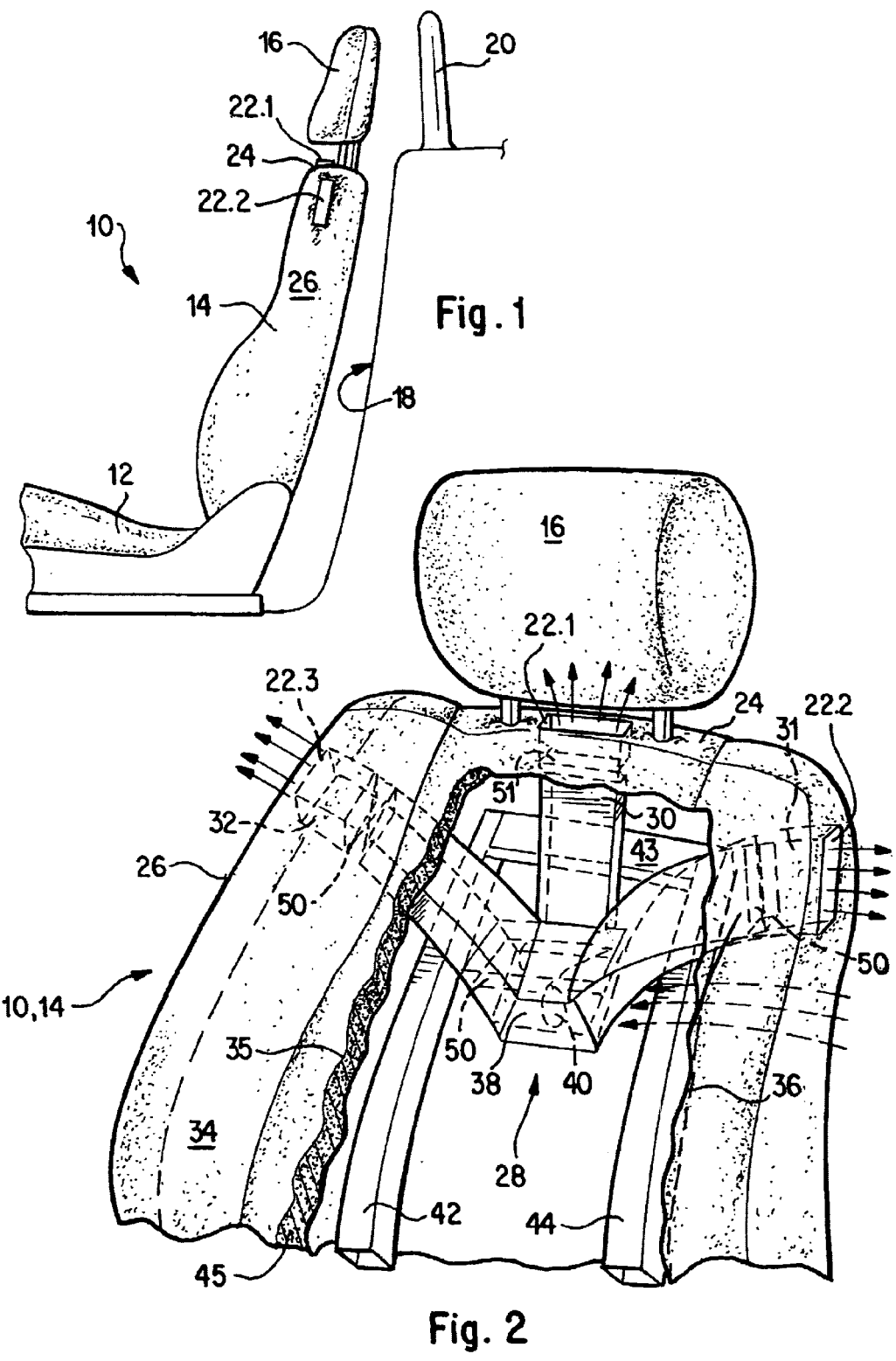
FIG. 1 shows a side view of a vehicle seat which is arranged within a passenger cell of an open motor vehicle with an air-distributing device integrated in the backrest, constructed according to a first embodiment of the invention.
FIG. 2 shows an enlarged perspective view of the backrest of the vehicle seat according to FIG. 1.

FIG. 1 illustrates, in a side view, a vehicle seat 10 which is arranged within a passenger cell of an open motor vehicle, designed here as a roadster, and which comprises a seat cushion part 12, a backrest 14 and a head restraint 16 assigned to the latter. Arranged behind the vehicle seat 10 is a rear partition 18 and a roll bar 20 of the motor vehicle. Air outflow openings 22.1, 22.2, and 22.3 of the windbreak device are arranged in an upper region of the backrest and belong to an air-distributing device, further described below. The air outflow openings 22.1 for an airflow emerging in the direction of the head restraint 16 are situated on the upper narrow side 24, and the other air outflow openings 22.2, 22.3 for an airflow emerge laterally outwards and are situated on the lateral, outer narrow side 26 of the backrest 14.

FIG. 2 shows, in an enlarged perspective view, the backrest 14 of the vehicle seat 10 according to FIG. 1, which backrest is illustrated cut open in a central region between two break lines 35, 36 and comprises a seat frame having lateral struts 42, 44 connected via a transverse yoke 43. Below the covering 34 of the backrest 14 the upholstery 45 thereof is indicated. The air-distributing device 28, which is integrated in the backrest 14, is supported by the lateral struts 42, 44 of the seat frame and, in the exemplary embodiment shown here, comprises three air ducts 30, 31, 32 leading to the air outflow openings 22.1, 22.2 and 22.3 on the lateral narrow sides 26 and the upper narrow side 24 of the backrest 14.

The three air ducts 30, 31, 32 open at the bottom in a common ventilator housing 38 which, in this exemplary embodiment, bears a fan 40 designed as an axial ventilator. Provided on the suction side of the fan 40 is a supply duct 46 which can be seen in FIG. 6 and ends in an air inlet opening 48 on the rear side of the backrest 14.

In the arrangement shown of the three air outflow openings 22.1, 22.2 and 22.3 on the lateral narrow sides 26 and on the upper narrow side 24 of the backrest 14, the air—also due to the orientation of the respectively assigned air ducts 30, 31, 32—flows out of the air outflow openings 22.1, 22.2 and 22.3 approximately at the level of the backrest 14.

Each of the air ducts 30, 31, 32 is assigned here an adjustable heating element 50 which is in each case illustrated by dashed lines and by means of which the air flows emerging from the air outflow openings 22.1, 22.2 and 22.3 can be heated depending on the individual desire of the vehicle occupant. As an alternative, a common heating element 50 for the air flows of all three air ducts 30, 31, 32 can be provided within the ventilator housing 38, said common heating element 50 being shown by dashed lines in FIGS. 2 and 3. In addition to the heating elements 50, evaporator elements or the like could additionally also be provided for cooling the air flows, in order, for example, to supply the vehicle occupants with cool air when driving with an open top on hot days.

Figure 3:
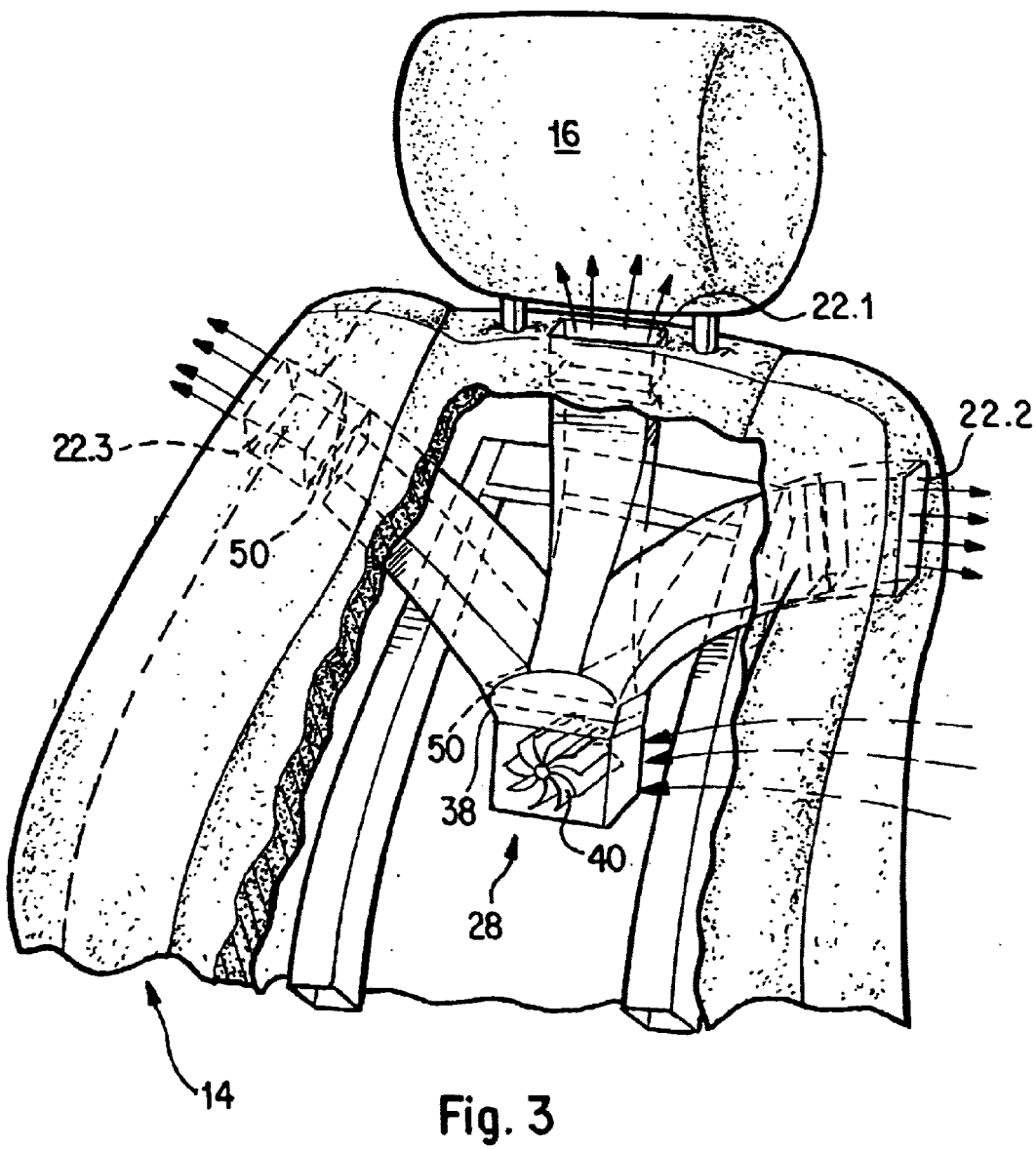
FIG. 3 shows a perspective view of a backrest of a vehicle seat with an air-distributing device according to a second embodiment of the invention.

FIG. 3 illustrates the backrest 14 in a perspective view with the head restraint 16 and the air-distributing device 28 in a further embodiment which differs from the version described with reference to FIGS. 1 and 2 only through a different design of the ventilator housing 38 and the use of a radial ventilator 40.

Figure 4:
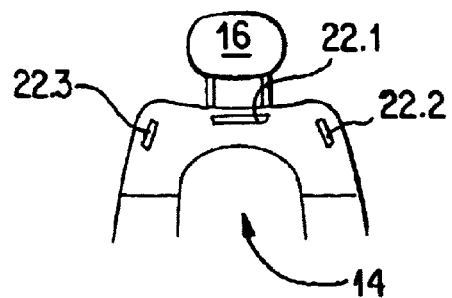
FIG. 4 shows a schematic front view of an upper region of the backrest with the air outflow openings according to FIG. 2.

FIG. 4 shows, in a schematic front view, the backrest 14 with the air-distributing device according to FIGS. 1 to 3 with air outflow openings 22.1, 22.2 and 22.3 indicated, which openings emerge here in the region of the seat surface of the backrest 14 facing the occupant rather than laterally and upwardly as in the embodiment of FIGS. 1–3.

Figure 5:
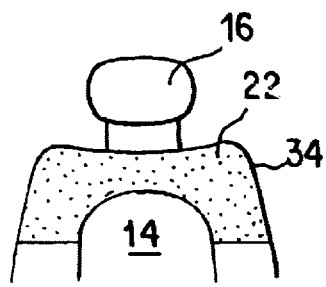
FIG. 5 shows a schematic front view of the upper region of a backrest with air outflow openings of an air-distributing device according to a third embodiment of the invention.
Figure 6:
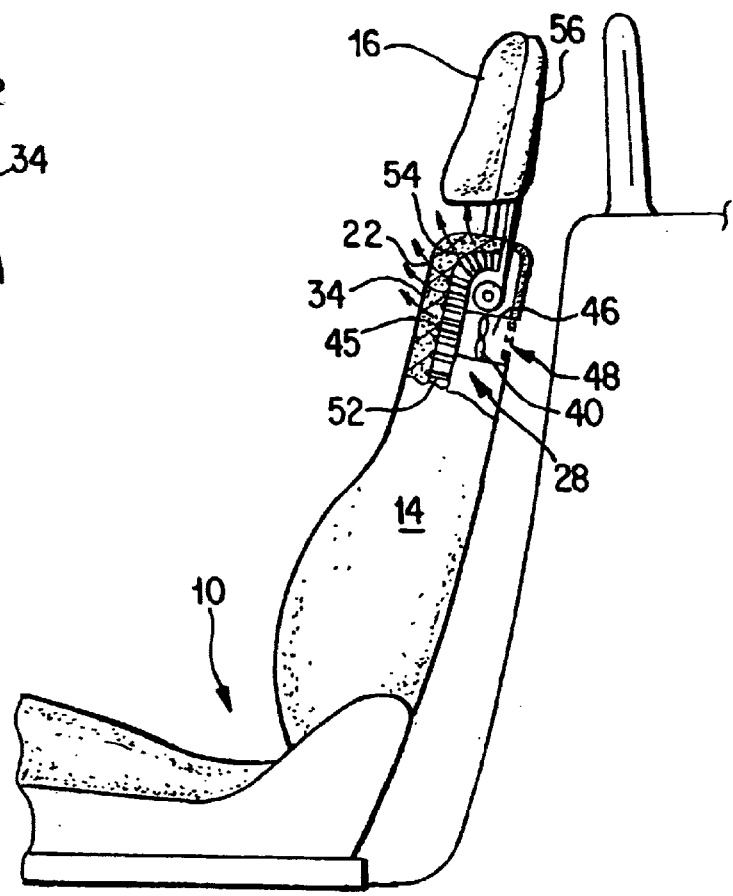
FIG. 6 shows a side view of a vehicle seat with an air-distributing device according to FIG. 5 integrated in the backrest and with a wind shield likewise integrated in the backrest.

FIGS. 5 and 6 show, in a schematic front view and in a partially cut-open side view, the backrest 14 of the vehicle seat 10 according to a further embodiment. In this case, the vehicle seat 10—as indicated in a dotted manner in FIG. 5—is covered in the upper region of the backrest 14 with a covering 34 made of textile material, perforated leather, or other perforated covering material, which covering is provided with a multiplicity of air outflow openings 22. This arrangement of the air outflow openings 22 causes a very uniform, diffuse distribution of the air flows about the head, neck and shoulder region of the vehicle occupant.

In FIG. 6, it can be seen that the air-distributing device 28 here is assigned a knitted spacer fabric 52 which is connected downstream of the ventilator housing 38, 40 and ensures a good distribution of the air flow emerging from the fan 40. The air emerging from the fan 40 and flowing through the knitted spacer fabric 52 passes through the upholstery 45, which is arranged on the knitted spacer fabric 52 and consists of air-permeable material, to the covering 34 with the air outflow openings 22. One or more heating or cooling elements for controlling the temperature of the emerging air flows can also be provided in the case of the air-distributing device 28 described here. In addition, strands 54 of a seat heating system can be seen here between the knitted spacer fabric 52 and the upholstery 45.

Figure 7:
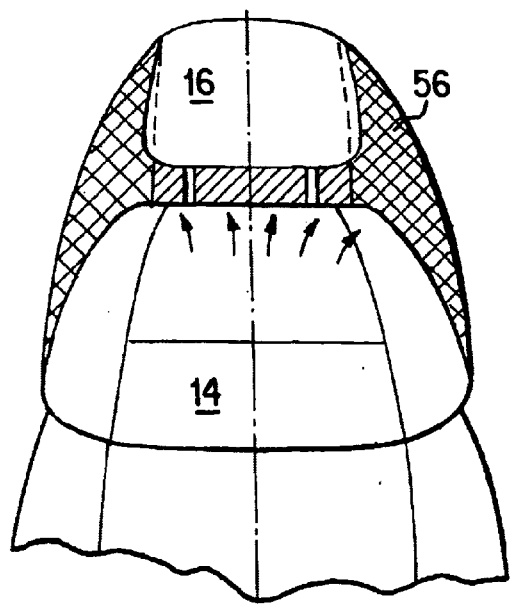
FIG. 7 shows a front view of the vehicle seat with the air-distributing device and the wind shield according to FIG. 6.

In order to further reduce swirling of air, in the vehicle seat 10 according to FIG. 6 a wind shield 56 is integrated in the backrest 14, which shield can be seen in FIG. 7 in a front view of the vehicle seat. This wind shield 56 is designed here as a rolling screen and can be extended or lowered manually or using a motor. In the extended position, the wind shield 56 in the version shown here can be fixed to the rear side of the head restraint 16. In order to give a better view to the rear, the wind shield 56 can be transparent and, as appropriate, can also be designed as a rigid element. It is also contemplated according to certain preferred embodiments of the invention to couple the lifting and lowering movements of the wind shield 56 and of the head restraint 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. An open motor vehicle, comprising:
a passenger cell including at least one vehicle seat having a backrest and associated head restraint, an air outflow opening of an air-distributing device being provided on an upper narrow side and a lateral outer narrow side of the backrest in order to reduce undesirable draughts for a vehicle occupant, wherein the air-distributing device is integrated in the backrest and is supported directly by the latter.

2. The open motor vehicle according to claim 1, wherein a fan connected upstream of the air-distributing device is integrated in the backrest.

3. The open motor vehicle according to claim 1, wherein the air-distributing device is assigned at least one heating element for heating an air flow.

4. The open motor vehicle according to claim 1, wherein a plurality of rows of seats having two vehicle seats each is arranged in the passenger cell of the motor vehicle, a separate air-distributing device being integrated into respective backrests of each seat in each row.

5. The open motor vehicle according to claim 1, wherein the air outflow opening is orientated in such a manner that air flow flows out essentially in a transverse direction of the vehicle.

6. The open motor vehicle according to claim 1, wherein the vehicle seat has, at least in an upper region of the backrest, a covering which is provided with air outflow openings, is made of perforated textile or plastic material or perforated leather and through which airflows provided by the air-distributing device emerge.

7. The open motor vehicle according to claim 1, wherein a wind shield is integrated in the backrest of the vehicle seat and is supported directly by the latter.

8. The open motor vehicle according to claim 7, wherein the wind shield can be extended and lowered, the lifting and lowering movement thereof being coupled in terms of movement to that of the head restraint.

9. A vehicle assembly with at least one vehicle seat assembly in a passenger cell, each vehicle seat assembly comprising:
   a backrest, and
   an air-distributing device supported in the backrest and having air outflow openings in an upper region of the backrest for reducing undesirable air draughts for a vehicle seat occupant during use of the vehicle seat assembly in an open motor vehicle;
   and further comprising a plurality of said seat assemblies, with at least two or said seat assemblies per row of seat assemblies and a plurality of rows of seat assemblies disposed behind one another.

10. A vehicle seat assembly comprising:
    a backrest, and
    an air-distributing device supported in the backrest and having an air outflow opening on an upper narrow side and a lateral outer narrow side of the backrest for reducing undesirable air draughts for a vehicle seat occupant during use of the vehicle seat assembly in an open motor vehicle.

11. A vehicle seat assembly according to claim 10, wherein a fan connected upstream of the air-distributing device is integrated in the backrest.

12. A vehicle seat assembly according to claim 10, wherein the air-distributing device is assigned at least one heating element for heating an air flow.

13. A vehicle seat assembly according to claim 10, wherein the air-distributing device includes an opening in a front side of the backrest.

14. A vehicle seat assembly according to claim 10, wherein the backrest has a covering in its upper region which is air permeable to form said outflow opening.

15. A vehicle seat assembly according to claim 14, wherein said covering is made of perforated leather.

16. A vehicle seat assembly according to claim 14, wherein said covering is made of perforated plastic.

17. A vehicle seat assembly according to claim 14, wherein said covering is made of textile fabric.

18. A vehicle seat assembly according to claim 10, further comprising:
    a headrest disposed above the backrest, and
    a wind shield disposed behind the headrest and an upper part of the backrest.

19. A vehicle seat assembly according to claim 18, wherein said headrest is supported for adjusting movement at the backrest.

20. A vehicle seat assembly according to claim 18, wherein the wind shield is supported at the backrest.

21. A vehicle seat assembly according to claim 18, wherein said wind shield is of a size sufficient to protrude laterally of portions of both the headrest and the backrest.

22. A vehicle seat assembly according to claim 18, wherein the wind shield can be extended and lowered, the lifting and lowering movement thereof being coupled in terms of movement to that of the headrest.

23. A vehicle assembly with at least one vehicle seat assembly in a passenger cell, each vehicle seat assembly comprising:
    a backrest, and
    an air-distributing device supported in the backrest and having an air outflow opening on an upper narrow side and a lateral outer narrow side of the backrest for reducing undesirable air draughts for a vehicle seat occupant during use of the vehicle seat assembly in an open motor vehicle.

24. A vehicle assembly according to claim 23, wherein a fan connected upstream of the air-distributing device is integrated in the backrest.

25. A vehicle assembly according to claim 23, wherein the air-distributing device is assigned at least one heating element for heating an air flow.

26. A vehicle assembly according to claim 23, each vehicle seat assembly further comprising:
    a headrest disposed above the backrest, and
    a wind shield disposed behind the headrest and an upper part of the backrest.

27. A vehicle assembly according to claim 26, comprising a plurality of said seat assemblies, with at least two of said seat assemblies per row of seat assemblies and a plurality of rows of seat assemblies disposed behind one another.

28. A vehicle assembly according to claim 23, comprising a plurality of said vehicle seat assemblies disposed side by side in a row.

29. A vehicle assembly according to claim 23, comprising a plurality of said seat assemblies, with at least two of said seat assemblies per row of seat assemblies and a plurality of rows of seat assemblies disposed behind one another.

30. An open motor vehicle, comprising:
    a passenger cell including at least one vehicle seat having a backrest and associated head restraint, air outflow openings of an air-distributing device being provided level with an upper region of the backrest in order to reduce undesirable draughts for a vehicle occupant, wherein the air-distributing device is integrated in the backrest and is supported directly by the latter;
    wherein a plurality of rows of seats having two vehicle seats each is arranged in the passenger cell of the motor vehicle, a separate air-distributing device being integrated into respective backrests of each seat in each row.

\* \* \* \* \*